United States Patent Office 3,004,892
Patented Oct. 17, 1961

3,004,892
FAT EMULSION AND PROCESS OF
PRODUCING SAME
John G. Hainsworth, La Canada, Harold Hershenson,
Burbank, and William O. Pool, Glendale, Calif., assignors to Don Baxter, Inc., Glendale, Calif., a corporation of Nevada
No Drawing. Filed Mar. 27, 1959, Ser. No. 802,309
5 Claims. (Cl. 167—66)

This invention relates to an aqueous, injectable, fat emulsion and to the process for producing such an emulsion.

It is generally accepted that intravenous fat emulsions are utilized and thus will satisfy the caloric requirements of seriously ill patients. Problems arise, however, in preparing an emulsion suitable for intravenous use. In order for the emulsion to be stable, an emulsifying or stabilizing agent must be used. Emulsifying agents usable for intravenous solutions are seriously limited by the requirement that they be nontoxic and that they be metabolized, excreted, or in some other way eliminated from the body so that they cannot cause chronic difficulties.

Some of the most suitable emulsifying agents for intravenous fat emulsions have been found in the class of vegetable phosphatides, such as those derived from soybeans. Since these phosphatides are made in large quantities for a multitude of purposes, they are relatively inexpensive and the inconsistencies often arising in products obtained from natural sources are minimized by quantity production. Purification of these mixtures has sometimes been most difficult because of the solubilizing effect which one component of the mixture may have on other components. When purified materials have been made, they have not been suitable either because of reactions in the patients receiving the emulsions, or because of instability of the emulsions.

Emulsions which have been made with the available vegetable phosphatide emulsifiers cause reactions in too many patients for general use. These reactions may be in the form of back pain, chill, dyspnea, pallor, flushing, fever, vomiting, cramps, or joint pains. Numerous conflicting publications report a reduction of reactions by using different emulsifiers, by decreasing the rate of administration, by varying the particle size of the emulsion, by eliminating the lower molecular weight fats, or by using different emulsifiers. Drawing proper conclusions from this work is very difficult.

The problem is further complicated by the fact that a fat emulsion can often be administered to many patients without causing reactions, yet the same emulsion will unexplainably cause reactions in other patients. Tachyphylaxis may complicate the testing problem. Also the occurrence of reactions in patients has not been clearly correlated with reactions in animals.

Various fractions of the vegetable phosphatides have been tried as emulsifiers. For example, Stare (Journal of Laboratory and Clinical Medicine 34: 688 (May 1949)), reported that alcohol fractionation resulted in phosphatide fractions which were either reactive, unsuitable as emulsifiers, or developed toxicity on autoclaving.

Even after a suitable fat emulsion has been made, there are still serious problems. To sterilize the emulsion, it is usually heated by steam under pressure to a temperature of about 115° C. This often results in the breaking of a portion of the emulsion so that droplets of fat are formed. Such droplets might mechanically obstruct the vascular system when injected intravenously and solutions containing them obviously do not meet the standards of pharmaceutical elegance desirable for intravenous preparations.

It is therefore an object of this invention to provide an intravenous fat emulsion, having a reduced incidence of undesirable reactions.

Another object of the invention is to provide a fat emulsion which will substantially reduce the incidence of back pain, chill, dyspnea, pallor, and flushing caused by the intravenous injection of such emulsion.

Another object of the invention is to provide a fat emulsion having a significantly reduced incidence of temperature rises, vomiting, cramps, and joint pains.

Another object is to provide a fat emulsion containing only ingredients which can be eliminated by the body.

Another object is to provide a fat emulsion having a phosphatide emulsifier which is relatively stable against oxidation.

Another object is to provide an intravenous fat emulsion containing a selected fraction of vegetable phosphatide as an emulsifying agent.

A further object is to provide a process for efficiently making the improved fat emulsion.

A still further object is to provide an improved sterilization process for fat emulsions.

The fat emulsion of our invention contains a selected fraction of vegetable phosphatide obtained by an alcohol fractionation method which has a choline to phosphorus molar ratio of 0.65 to 0.85.

In the practice of the invention, cottonseed oil is a particularly suitable fat. Other nontoxic, low melting, vegetable fats, such as peanut oil or sesame oil may be used. Before use, the fat is preferably heated and agitated with activated charcoal to reduce the color and to remove any possible pyrogenic or protein materials. For intravenous use, the fat may be used in concentrations of 10–35% by weight/volume (w./v.)

The phosphatide emulsifier for use in our invention is made by fractionation of commercially available vegetable phosphatide. Soybean phosphatides, such as Alcolec granules (American Lecithin Company), Asolectin (Associated Concentrates, Inc.), or Gliddophil R.G. (The Glidden Company), are particularly suitable. Alcolec granules, for example, are prepared from commercial soya phosphatides by a special low pressure process which removes the greater part of the oil, sterols, waxes, and other impurities. The resulting product is a slightly yellow, waxy, granular substance. Alcolec granules usually contain about 95% phosphatides which comprise approximately 30% lecithins, 30% cephalins, and 35% of sugars and complex lipid substances, including inositol phosphatides. The choline and inositol contents are each about 4%. Phosphorus content is about 3%.

A typical sample of Alcolec granules had the following assay:

Ash _____ 8%.
Nitrogen _____ 1.1%.
Iodine value _____ 90%.
Inositol _____ 4.3%.
Sterols _____ 1.0%.
Acetone insoluble material _____ 95%.
Linoleic acid _____ Approximately 30%.
Choline _____ 4.0%.
Phosphorus _____ 3.1%.
Choline to phosphorus
 (molar ratio) _____ 0.3.

The crude soybean phosphatide may, however, contain 2.9–3.6% phosphorus, 3.6–7.2% choline, and have a choline to phosphorus molar ratio of 0.3–0.6.

To prepare the phosphatide emulsifier, one kilogram of the vegetable phosphatide is extracted with about 4–8 liters of U.S.P. alcohol (95% ethanol). The extraction is effectively carried out in a heated mixing vessel and requires about one hour. At the end of the extraction the temperature should be between 40° and 75° C. and is preferably about 70° C. The mixture is then cooled to 30° C. with agitation, allowed to settle and the extract is drawn off. The residue usually comprises from 60–70% of the crude vegetable phosphatide. The extract is then cooled to a temperature of −10° to 10° C., but preferably about 5° C. After about 10–20 hours, the extract has separated into two layers and the cold supernatant is decanted or drawn off. The remaining material may be discarded or it may serve as raw material for future extractions.

The supernatant contains about 25–32% of the crude vegetable phosphatide and has a solids content of 4%–7.5% (w./v.). If this solids content is too low the molar ratio of choline to phosphorus will be too low. If the solids content is too high the yield will be low. The solids should have a choline content of about 7.5–9.1%, and a phosphorus content of 2.9–3.6%. Solubility of the solids in U.S.P. alcohol at 5° C. should be at least 4.5% (w./v.).

The choline to phosphorus molar ratio is between .65 and .85. Assuming a 3% phosphorus content, the emulsifier will then contain 50–65% phosphatidyl choline. Thus the choline recovered represents about 55–70% of the choline in the crude phosphatide material. For best results the choline to phosphorus ratio should be between .66 and .75 and preferably is close to .70. Materials having a choline to phosphorus ratio higher than 0.85 are poor emulsifying agents, and usually require the use of a supplementary emulsifier.

In addition to the choline containing phosphatides (lecithins), the emulsifying agent contains from 10–20% phosphatidylethanolamine and not more than 2% phosphatidylserine. These amounts are equivalent to an ethanolamine to phosphorus molar ratio of about 0.14–0.28 and a serine to phosphorus molar ratio of not more than 0.026. On the other hand, the residual material from the alcohol extraction usually contains about 24% phosphatidylethanolamine and about 5% phosphatidyl serine.

The fractionation also reduces the inorganic materials present. In general, the amount of potassium in the emulsifier should be not more than 0.5% of the solids, of calcium less than 0.002%, of magnesium less than 0.0002%, and of strontium 0.00001%. Ash should be not more than 2%.

The serine contents described in this application were determined after hydrolysis of the sample with hydrochloric acid by a modification of the copper method of Pope and Stevens (Albanese and Irby, J. Biol. Chem. 153, 583 (1944)). Ethanolamine contents were determined by the Burmaster periodate oxidation method (Burmaster, C.F., J. Biol. Chem. 165, 1 (1946)), which determines the amino nitrogen in both serine and ethanolamine, deducting the serine nitrogen content previously determined, and calculating the ethanolamine from the remaining nitrogen content.

Choline contents described in this application were determined by a Reineckate precipitation method described by Glick (J. Biol. Chem. 156, 643 (1944)). In this method, a sample containing about 10 milligrams of choline is hydrolized with saturated barium hydroxide. The sample is then neutralized with acetic acid and a methanol solution of Reinecke salt added. The sample is cooled to about 5° C., filtered, and washed. The precipitate is dissolved in acetone and the absorption at 526 millimicrons determined on a spectrophometer. The absorption is then compared with a calibration curve to determine the amount of choline present.

Materials which interfere with the choline analysis are seldom present in phosphatides. In fat emulsions, however, such materials may be present as supplementary emulsifying agents or as added drugs. In fat emulsions the presence of a relatively large amount of fat in the emulsion, apparently prevents complete hydrolysis of the phosphatide emulsifier. Analytical values obtained for choline to phosphorus ratios in fat emulsions are therefore slightly lower than would be expected from the choline to phosphorus ratios of the emulsifier. Thus, when the determination is made on the emulsion, the choline to phosphorus molar ratio should be between 0.60 and 0.80. For best results the choline to phosphorus ratio should be between 0.61 and 0.70, and is preferably close to 0.65.

Phosphorus contents described in this application were determined by a phosphomolybdate method described by Harris and Popat (Journal American Oil Chemists Society 31: 124 (1954)). In this method, the sample is digested with sulfuric acid and hydrogen peroxide to destroy the organic matter. Five percent ammonium molybdate solution is added. A reducing solution containing 0.5% p-methylaminophenol sulfate, 12.5% sodium bisulfite and 2.4% sodium sulfite, is then added. The optical density of the blue phosphomolybdate complex is then measured at 815 millimicrons on a spectrophotometer, and the phosphorus determined by comparison with a calibration curve.

The above method of determining phosphorus obviously determines both inorganic phosphorus and bound organic phosphorus. The phosphorus contents referred to in this application are organic phosphates. If inorganic phosphates are present, they should be determined by the above method before digestion of the organic material and deducted from the total phosphorus determined above.

If desired, a fractionated phosphatide may be obtained without using refrigeration. In this case, the alcohol extraction is performed as described above, then the extract is drawn off and concentrated under vacuum. After approximately half of the alcohol has been distilled off, the mixture is allowed to separate into two layers at room temperature. The supernatant upper layer is then decanted. It should contain a solids content of 11–20% (weight/volume) and a choline to phosphorus molar ratio within the above described range. If it is desired to further increase the choline to phosphorus ratio, additional concentration may be carried out followed by settling at room temperature until the choline to phosphorus ratio of the supernatant liquid is within the desired range.

After a phosphatide fraction having the desired choline to phosphorus molar ratio is obtained, the alcohol is distilled off until the mixture is approximately 50% phosphatide. At this point of portion of the fat to be used in the emulsion is added to the mixture and the alcohol evaporation continued under vacuum. When the alcohol has been substantially removed, the mixture of fat and phosphatide is weighed and analyzed. To our surprise, we found that this phosphatide fraction is quite stable against oxidation and may be stored in either alcohol or oil. The fat-phosphatide mixture usually contains between 0.7 and 0.9% phosphorus and the amount of mixture to be added to the final emulsion is adjusted accordingly. The amount of emulsifier should normally be between 6.7 and 9.3% of the weight of the fat used.

Alternatively, the phosphatide fraction may be precipitated from the alcohol solution with acetone, filtered dried and dissolved in the fat. In this case, however, the phosphatide is exposed to more air oxidation than in the above process. Also the phosphatide is sometimes difficult to suspend in fat after the acetone and alcohol have been removed.

In order for the fat emulsion to be approximately isotonic, approximately 5% (w./v.) of a monosaccharide is usually included in the water phase. Dextrose, fructose or invert sugar may be used for this purpose in concentrations of 2–10%. The monosaccharide is first dissolved in distilled water and heated to between 60 and 85° C. The pretreated fat, containing the fractionated emulsifier, is also heated and then is introduced with agitation below the surface of the monosaccharide solution.

The mixture is homogenized, diluted to final volume, filtered, and filled into containers.

After sterilization, fat emulsions often have droplets of fat on the surface. Such droplets detract from the appearance of the product, and they are hazardous to inject because they may block the vascular system. We have found that these droplets are due to evaporation of water from the surface of the emulsion while it is cooling after sterilization. According to our invention the formation of these droplets can be prevented by agitating the emulsion during the cooling period. A fan, or hot water spray, or both, may be directed on the containers to increase the cooling rate and to help keep all units at the same temperature during shaking.

Preferably the agitation is vigorous enough to keep the entire emulsion well mixed. This may be accomplished by placing the bottles on a reciprocating shaker. Best results are obtained by placing the bottles horizontally so that their respective axes are parallel to the direction of motion of the shaker. This allows more movement of the fluid contents than if the bottles moved sideways. However, suitable shaking can be obtained by merely agitating enough to break up or mix the surface layer of emulsion.

EXAMPLE 1

An emulsion was prepared from:

| Ingredients: | Parts by weight |
|---|---|
| Cottonseed oil | 15.0 |
| Dextrose, U.S.P. | 4.5 |
| Soybean phosphatide fraction | 1.2 |

Water to make 100 parts by volume.

The cottonseed oil was first heated with activated carbon to 70° C., then filtered and autoclaved at 115° C. for 20 minutes.

The soybean phosphatide fraction was prepared from commercially available soybean phosphatide (Alcolec granules) by the following procedure. Four kilograms of crude phosphatide were placed in a jacketed mixer with 24 liters of alcohol, U.S.P. (95% ethanol). The mixture was then agitated and the temperature increased to 70° C. After about one hour of agitation and heating, the mixture was cooled to 30° C., and the extract drawn off from the insoluble material. The extract was then cooled to 5° C. and allowed to settle for approximately 13 hours. This caused a separation of the mixture into two liquid layers. The cold upper layer was then decanted and analyzed for choline and phosphorus. It was found to have the following properties:

| | |
|---|---|
| Volume | liters 22.7 |
| Weight of solids | grams 1133 |
| Solids (weight/volume) | percent 4.99 |
| Choline content | grams 95.7 |
| Choline | percent 0.422 |
| Phosphorus content | grams 36.3 |
| Phosphorus | percent 0.160 |

The solids present in this upper layer contained:

| | |
|---|---|
| Choline | percent 8.46 |
| Phosphorus | do 3.21 |
| Choline to phosphorus molar ratio | 0.675 |

The choline found in this upper layer represented 67% of the choline present in the raw material, the phosphorus 28% of the phosphorus in the raw material, and the solids 28.5% of the raw material solids.

The alcohol was then distilled off under vacuum at a temperature of 40° C. until a total volume of 1 liter remained. Two kilograms U.S.P. grade, cottonseed oil, treated as previously described, were then added to the phosphatide-alcohol mixture and distillation of the alcohol continued. Finally another kilogram of cottonseed oil was added and distillation continued until no more alcohol distilled off. By analysis the fat-phosphatide mixture was found to contain 0.92% phosphorus by weight, equivalent to 1,135 grams of phosphatide, and 11.2 kilograms of cottonseed oil were added to complete the oil phase of the emulsion.

The dextrose was then dissolved in distilled water and the solution heated to 85° C. The phosphatide-cottonseed oil mixture was heated to 85° and introduced below the surface of the dextrose solution with constant agitation. The agitation was continued for 10 minutes after all the oil phase had been added, and the temperature was maintained at 85° C. The mixture was then homogenized by four passes through a two-stage Manton-Gaulin homogenizer. With the first homogenizer stage open, the second stage was set for 2,000 p.s.i. The first stage was then set for 6,000 p.s.i. Thus the emulsion was forced through two orifices. In passing through the first orifice, the pressure dropped from 6,000 p.s.i. to 2,000 p.s.i. In passing through the second orifice, the pressure dropped from 2,000 p.s.i. to atmospheric.

After homogenization, the emulsion was cooled to 30° C., distilled water was added to the final volume, and the emulsion filtered through a No. 50 Whatman filter paper. It was then filled into glass containers, a vacuum was drawn in each container, and the containers were sealed and sterilized at 115° C. for fifteen minutes.

After sterilization, the steam was turned off and the autoclave allowed to reach atmospheric pressure. The bottles were allowed to stand in the autoclave for approximately ten minutes and were then removed and placed on a shaker. For best results, the bottles were placed in a horizontal position with the longitudinal axis lying in the direction of the shaker's motion. The bottles were shaken for approximately one half hour. A fan was then turned on and simultaneous fanning and shaking continued until the bottles were cooled to approximately 30° C.

The emulsion of Example 1 contained 80% w./v. water, 15.8% w./v. fat, 4.52% w./v. dextrose, 1.23% w./v. phosphatide (based on phosphorus content), and 0.025% w./v. free fatty acids (as oleic acid). It had a pH of 4.5, a titratable acidity of 0.84 milliequivalent per liter, and a peroxide number of 8.9. It was sterile, nontoxic and nonantigenic. The mean temperature rise in 10 rabbits was 0.6° C. and no temperature rise exceeded 1.4° C. A vasomotor test in cats showed the emulsion when injected at a dose of 0.66 milliliter per kilogram of body weight, to have a depressor effect less than 8 micrograms of histamine.

The emulsion had no droplets of fat on the surface, and when examined microscopically in Petroff-Hausser cells, a volume of 0.012 cubic millimeter contained less than five particles having diameters between five and ten microns and less than one particle on an average, having a diameter greater than 10 microns.

Other lots of fat emulsion having the same formulation were prepared by this procedure. Some variation naturally occurred even though the same procedure was used in each case. Properties of the phosphatide fractions are shown in Table I.

Phosphatide fraction A and the residue remaining after alcohol extraction were further analyzed for phosphatidylserine and phosphatidylethanolamine. The following results were obtained:

| | Purified Emulsifier | Residual Material |
|---|---|---|
| Phosphatidylserine, as percent of solids | 1 | 5 |
| Serine, as percent of solids | 0.13 | 0.7 |
| Serine/phosphorus molar ratio | 0.014 | 0.07 |
| Phosphatidylethanolamine, as percent of solids | 16 | 24 |
| Ethanolamine | 1.3 | 2.0 |
| Ethanolamine/phosphorus molar ratio | 0.23 | 0.35 |

Samples of the purified emulsifier and of the residue after extraction were ashed and analyzed spectrographically for inorganic materials. The following significant differences in the two materials were found:

|  | Purified Emulsifier | Residual Material |
|---|---|---|
| Ash, as percent of solids | 1.57 | 8.77 |
| Potassium, as percent of solids | 0.256 | 1.44 |
| Calcium, as percent of solids | 0.0006 | 0.52 |
| Magnesium, as percent of solids | 0.00006 | 0.17 |
| Iron, as percent of solids | 0.0004 | 0.007 |
| Strontium, as percent of solids | nil | 0.0013 |

*Table I*

|  | A | B | C | D | E | F |
|---|---|---|---|---|---|---|
| Volume of solution, liters | 22.9 | 22.8 | 22.4 | 22.9 | 22.8 | 22.6 |
| Solids, percent (w./v.) | 4.6 | 4.9 | 4.9 | 4.7 | 4.5 | 4.5 |
| Choline, as percent of solution | 0.36 | 0.41 | 0.40 | 0.39 | 0.37 | 0.38 |
| Choline, as percent of solids | 8.0 | 8.4 | 8.2 | 8.3 | 8.2 | 8.5 |
| Phosphorus, as percent of solution | 0.13 | 0.15 | 0.15 | 0.15 | 0.14 | 0.14 |
| Phosphorus, as percent of solids | 2.9 | 3.0 | 3.0 | 3.1 | 3.1 | 3.2 |
| Choline/phosphorus molar ratio | 0.71 | 0.71 | 0.70 | 0.68 | 0.67 | 0.68 |
| Yield, as percent of choline recovered | 57 | 65 | 63 | 62 | 59 | 59 |
| Yield, as percent of phosphorus recovered | 25 | 27 | 28 | 28 | 27 | 27 |
| Yield, as percent of solids recovered | 26 | 27.5 | 28 | 27 | 26 | 25 |

EXAMPLE 2

One kilogram of "Alcolec" soybean phosphatide was extracted with 6 liters of alcohol, U.S.P. at 70° C. The extract was analyzed, then cooled to 4° C. and allowed to stand for approximately 68 hours. The supernatant solution was decanted and the lower layer dispersed in chloroform. Analysis of the extract, the superatant solution and the lower layer is shown in Table II. The supernatant solution had a choline to phosphorus molar ratio of 0.69 and can be made into a suitable emulsion by the procedure described in Example 1.

*Table II*

|  | Extract | Upper Layer | Lower Layer |
|---|---|---|---|
| Solids, as percent w./v. of supernatant | 5.9 | 4.4 |  |
| Choline, as percent of solids | 7.4 | 8.9 | 3.9 |
| Phosphorus, as percent of solids | 3.0 | 3.3 | 2.8 |
| Choline/phosphorus molar ratio | 0.62 | 0.69 | 0.36 |
| Yield, as percent of choline recovered | 65 | 57 | 11 |
| Yield, as percent of phosphorus recovered | 27 | 25 | 9 |
| Yield, as percent of solids recovered | 32 | 23 | 10 |

EXAMPLE 3

One kilogram of soybean phosphatide was extracted with 6 liters of alcohol, U.S.P. at 70°. The mixture was cooled to 40° C. and the extract drawn off. The residual material was extracted with another 6 liters of alcohol, the mixture cooled and the second extract drawn off. The two extracts were combined, allowed to stand approximately 15 hours at 4° C. and the upper layer (A) drawn off. The solids content of the upper layer was 3.2% w./v. and the molar ratio of choline to phosphorus was 0.62.

The mixture was then evaporated under vacuum at 40° C. until the total volume was about one-half the original volume. The mixture was again allowed to stand for about 15 hours at 4° C. and the supernatant solution (B) drawn off and analyzed. As shown in Table II, the solids content was 4.6% (w./v.) and the choline to phosphorus molar ratio of the solid material was 0.74.

The volume of solution (B) was reduced to approximately one half by vacuum distillation of the alcohol at 40° C. and the solution was allowed to settle at 4° C. The solids content was 7.4% (w./v.) and the choline to phosphorus molar ratio of the supernatant (C) was now found to be 0.89.

Two thousand grams of cottonseed oil were then added to 214 grams of solution (C) and the alcohol distilled off as in Example 1. The emulsions made from this material generally contained a few small fat droplets, indicating a poor, or borderline emulsion.

*Table III*

|  | A | B | C |
|---|---|---|---|
| Volume of solution, liters | 11.8 | 5.9 | 2.9 |
| Solids, percent (w./v.) | 3.2 | 4.6 | 7.4 |
| Choline, as percent of solids | 7.6 | 9.8 | 10.3 |
| Phosphorus, as percent of solids | 3.2 | 3.4 | 3.0 |
| Choline/phosphorus molar ratio | 0.62 | 0.74 | 0.89 |
| Yield, as percent of choline recovered | 83 | 74 | 62 |
| Yield, as percent of phosphorus recovered | 40 | 30 | 22 |
| Yield, as percent of solids recovered | 38 | 27 | 22 |

EXAMPLE 4

One kilogram of crude soybean phosphatide was extracted with 6 liters of alcohol, U.S.P. at 70° C. as in Example 1. The mixture was allowed to stand about 15 hours at room temperature and the extracted decanted. One hundred milliliter portions of the extract were then evaporated under vacuum to various volumes and the solutions allowed to cool and separate. The supernatant was then drawn off and analyzed. Emulsifiers C, D, and E can be used in this invention.

*Table IV*

|  | A | B | C | D | E |
|---|---|---|---|---|---|
| Volume after evaporation, milliliters | 100 | 50 | 30 | 20 | 14 |
| Solids, as percent w./v. of solution | 6.7 | 10.7 | 14.5 | 18.2 | 24.4 |
| Choline, as percent of solids | 6.3 | 7.9 | 8.0 | 8.6 | 8.7 |
| Phosphorus, as percent of solids | 3.1 | 3.2 | 3.1 | 3.2 | 3.1 |
| Choline/phosphorus molar ratio | 0.52 | 0.64 | 0.66 | 0.70 | 0.72 |
| Yield, as percent of choline recovered | 100 | 95 | 70 | 51 | 29 |
| Yield, as percent of phosphorus recovered | 100 | 77 | 56 | 38 | 21 |
| Yield, as percent of solids recovered | 100 | 77 | 56 | 38 | 21 |

EXAMPLE 5

One kilogram of soybean phosphatide was extracted with 6 liters of alcohol, U.S.P. at 70° C. The extract was then cooled to room temperature and allowed to stand for approximately 15 hours. The supernatant (A) was then drawn off and analyzed (Table V-A).

The supernatant solution (A) was then distilled under vacuum until the volume was reduced by approximately one third, and the solids content increased to 13% w./v. It was again allowed to stand at room temperature and the supernatant (B) drawn off and analyzed.

The lower layer from the separation of supernatant (B) was then extracted with an additional 6 liters of alcohol, and the mixture allowed to stand at room temperature. The extract (C) was then drawn off and analyzed. The supernatant fraction B was suitable as an emulsifier in this invention.

*Table V*

|  | A | B | C |
|---|---|---|---|
| Solids, percent (w./v.) | 5.7 | 13.1 |  |
| Supernatant volume, liters | 5.7 | 3.6 | 6 |
| Choline, as percent of solids | 6.4 | 8.1 | 5.3 |
| Phosphorus, as percent of solids | 3.2 | 3.1 | 2.9 |
| Choline/phosphorus molar ratio | 0.52 | 0.68 | 0.47 |
| Yield, as percent of choline recovered | 58 | 43 | 16 |
| Yield, as percent of phosphorus recovered | 35 | 19 | 9 |
| Yield, as percent of solids recovered | 33 | 19 | 9 |

From the above it is apparent that production of a desirable emulsion for parenteral injection consists in using a vegetable phosphatide emulsifier from which substantially all of the inositol and phosphatidylserine have been removed. If all of the phosphatidylserine and phosphatidylethanolamine are removed, the phosphatide would have a choline to phosphorus ratio of 1.0, but would be a poor emulsifying agent. We have therefore found that a satisfactory emulsifying agent is obtained by leaving in 10–20% phosphatidylethanolamine and not more than 2% phosphatidylserine.

We claim:
1. A stable, sterile, nonpyrogenic, nontoxic fat emulsion for intravenous injection comprising: 10 to 35% w./v. of a low-melting, nontoxic, vegetable fat and a soybean phosphatide fraction in an amount of 6.7 to 9.3% by weight of the fat, said phosphatide fraction having a choline to phosphorus molar ratio of 0.65 to 0.85, an ethanolamine to phosphorus molar ratio of 0.14 to 0.28 and a serine to phosphorus molar ratio of not more than 0.026, and being derived from soybean phosphatide having a choline to phosphorus molar ratio of 0.3 to 0.6 by extracting said phosphatide with alcohol to form an extract containing 25 to 50% w./v. solids, cooling the extract to a temperature of −10 to 10° C., and separating the supernatant solution containing said phosphatide fraction.

2. An injectable fat emulsion as set forth in claim 1 wherein the nontoxic vegetable fat is cottonseed oil and the phosphatide fraction has a choline to phosphorus molar ratio of 0.7, an ethanolamine to phosphorus molar ratio of 0.2 and a serine to phosphorus molar ratio of 0.01.

3. A process for preparing a stable, sterile, injectable fat emulsion comprising: extracting soybean phosphatide having a choline to phosphorus molar raito of 0.3 to 0.6 with alcohol; cooling the extract thereby obtained to a temperature of −10 to 10° C.; separating off a supernatant solution in which the molar ratio of choline to phosphorus is between 0.65 and 0.85; adding a nontoxic vegetable fat to said extract; removing the alcohol; adding water to the fat-phosphatide mixture; and homogenizing the mixture to form an emulsion.

4. A process for preparing a stable, sterile, injectable fat emusion comprising: extracting a soybean phosphatide having a choline to phosphorus molar ratio of 0.3 to 0.6 with alcohol to obtain an extract having 25–50% solids; cooling the extract to a temperature of −10 to 10° C.; separating off a supernatant solution having a solids content of 4 to 7.5% w./v. and a choline to phosphorus molar ratio of 0.65 to 0.85; adding a nontoxic vegetable fat to said extract; removing the alcohol; adding water to the fat-phosphatide mixture and homogenizing the mixture to form an emulsion.

5. A process for preparing a stable, sterile, injectable, fat emulsion comprising; extracting one part by weight of a commercial soybean phsophatide having a phosphorus content of 2.9 to 3.6% and a choline to phosphorus molar ratio of 0.3 to 0.6, with 4 to 8 parts by volume of alcohol at a temperature of 40 to 75° C.; cooling the extract thereby obtained to a temperature of −10 to 10° C. to obtain a supernatant containing 25 to 32% of the original phosphatide and 55 to 70% of the original choline, and having a solids content of 4 to 7.5% w./v., said solids having a phosphorus content of 2.9 to 3.6% and a choline to phosphorus molar ratio of .66 to .75; adding a nontoxic vegetable fat to said extract and removing the alcohol by evaporation; adding water to the fat-phosphatide mixture and homogenizing to form an emulsion; filling the emulsion into individual containers; heat sterilizing the emulsion; placing the individual containers in a horizontal position; and shaking said containers while cooling after sterilization.

References Cited in the file of this patent
UNITED STATES PATENTS
2,945,869   Meyer et al. _____ July 19, 1960
FOREIGN PATENTS
770,426   Great Britain _____ Mar. 20, 1957
OTHER REFERENCES Geyer et al.: J. American Oil Chemists Soc. 32, pp. 366–370, June 1955.

Waddell et al.: J. Lab. & Clin. Med. 45: 5, pp. 697–710, May 1955.

Lever et al.: J. Investigative Derm. 28: 4, pp. 317–324, April 1957.

Johnson et al.: J. Lab. & Clin. Med., vol. 39, pp. 176–183, February 1952.

Meng et al.: J. Lab. & Clin. Med. 33: 6, pp. 689–707, June 1948.

Becker et al.: J. Lab. & Clin. Med. 43: 5, pp. 752–758, May 1954.

Freeman: Quar. Bull. Northwestern U. Med. School 28:2, pp. 113–123, summer 1954.